United States Patent
Schneider et al.

(10) Patent No.: US 10,218,660 B2
(45) Date of Patent: Feb. 26, 2019

(54) DETECTING USER GESTURES FOR DISMISSING ELECTRONIC NOTIFICATIONS

(71) Applicant: Google Inc., Mountain View, CA (US)

(72) Inventors: Thomas Schneider, Winchester, MA (US); Jokubas Zukerman, San Francisco, CA (US); Maurice Shore, Carlisle, MA (US); Melissa Youngju Byun, Boston, MA (US)

(73) Assignee: Google LLC, Mountain View, CA (US)

( * ) Notice: Subject to any disclaimer, the term of this patent is extended or adjusted under 35 U.S.C. 154(b) by 1040 days.

(21) Appl. No.: 14/108,946

(22) Filed: Dec. 17, 2013

(65) Prior Publication Data

US 2015/0172249 A1   Jun. 18, 2015

(51) Int. Cl.
*G06F 3/048*     (2013.01)
*H04L 12/58*     (2006.01)
*G06F 3/0488*    (2013.01)

(52) U.S. Cl.
CPC .......... H04L 51/24 (2013.01); *G06F 3/04883* (2013.01)

(58) Field of Classification Search
CPC ...... G06F 3/017; G06F 3/0481; G06F 3/0488; G06F 19/3406; G06F 3/04886; G06F 9/542; G06F 3/04845; G06F 3/0485; G06F 3/03547; G06Q 10/10; H04L 51/24; H04L 67/22; H04M 1/72547; H04M 19/048; H04N 21/4882
See application file for complete search history.

(56) References Cited

U.S. PATENT DOCUMENTS

| | | | | |
|---|---|---|---|---|
| 8,694,916 B2* | 4/2014 | Sohn | ................. | H04M 1/72547 715/808 |
| 9,015,641 B2* | 4/2015 | Bocking | ................. | G06F 3/017 715/863 |
| 2004/0189720 A1* | 9/2004 | Wilson | ............... | G06K 9/00355 715/863 |
| 2004/0193413 A1* | 9/2004 | Wilson | .................... | G06F 3/017 704/243 |
| 2008/0221986 A1* | 9/2008 | Soicher | .................. | G06Q 30/02 705/14.36 |
| 2010/0188268 A1* | 7/2010 | Grignani | ............. | G06F 3/03547 341/22 |
| 2010/0248688 A1* | 9/2010 | Teng | ....................... | H04M 1/67 455/411 |
| 2011/0154390 A1* | 6/2011 | Smith | .................. | H04N 21/482 725/32 |
| 2011/0264491 A1* | 10/2011 | Birnbaum | ............... | G06F 3/016 705/14.4 |

(Continued)

*Primary Examiner* — Phuong H Nguyen
(74) *Attorney, Agent, or Firm* — Shumaker & Sieffert, P.A.

(57) ABSTRACT

A client user accesses content that is primarily textual in nature. A status of the user related to the content is detected, and a notification is provided for display to the user that is based on the user status. The notification is located in a notification area, and obscures at least part of the content, which is located in a content area. The user performs a gesture referencing the content area to dismiss the notification. In some cases, the gesture involves a gesture that the user would normally make to perform an action related to the content even if the notification were not displayed. The notification is then removed from display, and the action related to the content is simultaneously implemented.

18 Claims, 5 Drawing Sheets

(56) References Cited

U.S. PATENT DOCUMENTS

| | | | | |
|---|---|---|---|---|
| 2012/0075327 A1* | 3/2012 | MacKenzie | G06F 3/04883 | 345/589 |
| 2012/0102400 A1* | 4/2012 | Worley | G06F 3/0488 | 715/702 |
| 2012/0102437 A1* | 4/2012 | Worley | G06F 3/04883 | 715/863 |
| 2012/0159327 A1* | 6/2012 | Law | H04N 21/47217 | 715/716 |
| 2012/0204191 A1* | 8/2012 | Shia | G06Q 10/10 | 719/318 |
| 2014/0282272 A1* | 9/2014 | Kies | G06F 3/017 | 715/863 |
| 2014/0300540 A1* | 10/2014 | Beadle | G07C 9/00007 | 345/156 |
| 2014/0304645 A1* | 10/2014 | Osman | G06F 3/0481 | 715/784 |
| 2014/0359023 A1* | 12/2014 | Homsany | H04L 51/08 | 709/206 |
| 2014/0365569 A1* | 12/2014 | Vyrros | H04L 51/00 | 709/204 |
| 2014/0368422 A1* | 12/2014 | Gupta | G06F 3/0304 | 345/156 |
| 2015/0026572 A1* | 1/2015 | Cahill | G06F 3/0488 | 715/716 |
| 2015/0074615 A1* | 3/2015 | Han | G06K 9/00033 | 715/863 |
| 2015/0089636 A1* | 3/2015 | Martynov | G06F 3/1423 | 726/19 |
| 2015/0119667 A1* | 4/2015 | Reihman | G06F 19/3468 | 600/365 |
| 2015/0164390 A1* | 6/2015 | Larvenz | G06F 19/3406 | 600/365 |

\* cited by examiner

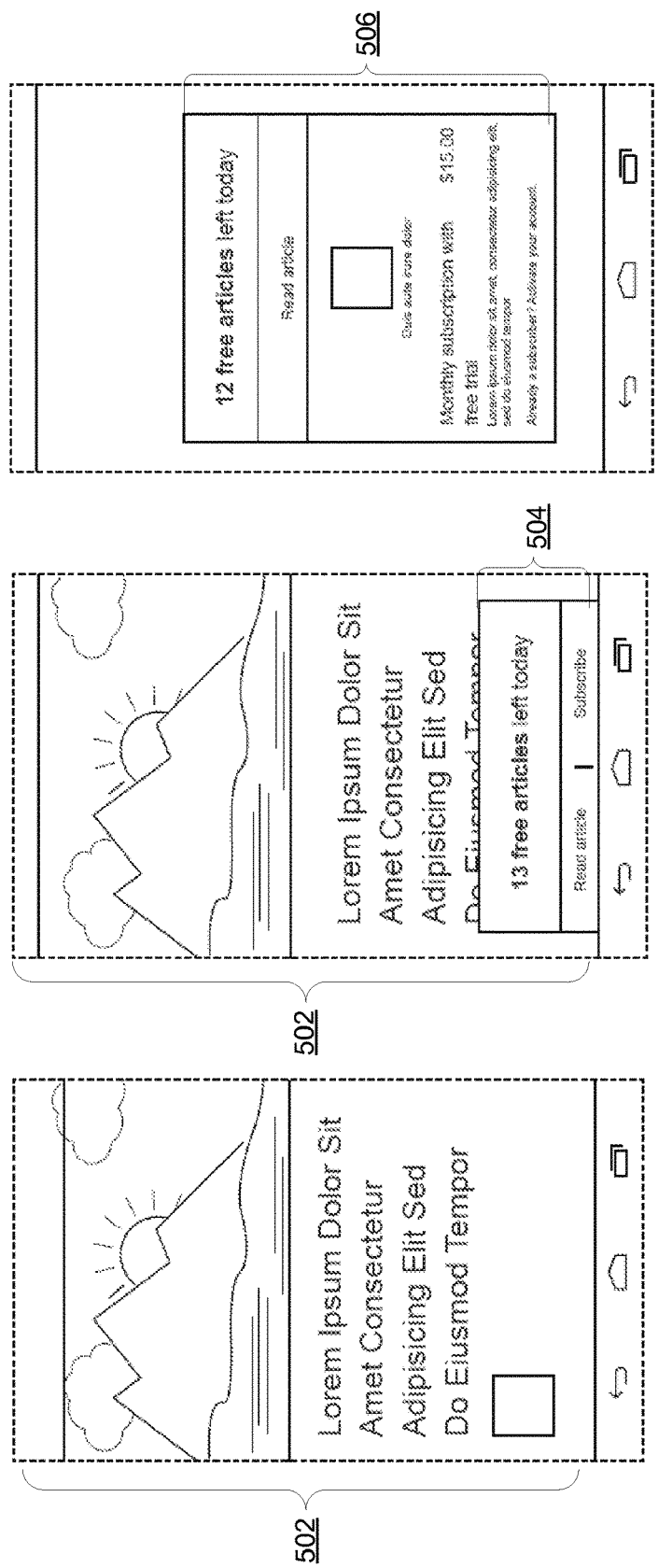

US 10,218,660 B2

DETECTING USER GESTURES FOR DISMISSING ELECTRONIC NOTIFICATIONS

FIELD OF DISCLOSURE

The invention generally relates to electronic notifications and particularly relates to detecting and processing gestures by client users for dismissing such notifications.

BACKGROUND INFORMATION

Many people use mobile devices to read various types of content, such as newspaper articles, magazine articles, or eBooks. In some cases, a notification or a reminder for a reader may be displayed while the reader is accessing content. Such a notification can be annoying for the user, who may not wish to view the notification at that time and may wish to return to the content.

SUMMARY OF THE INVENTION

The above and other issues are addressed by a computer-implemented method and a computer system including a non-transitory computer-readable storage medium having executable computer program instructions for detecting a user gesture indicating a notification dismissal. An embodiment of the method and computer program instructions includes identifying a status of a user of a client device. The status is identified responsive to the user accessing content displayed in a content area of a display screen of the client device, and the status is related to the accessed content. A notification is provided to the user based on the user status, and the notification is displayed in a notification area of the display screen, obscuring at least part of the accessed content. A gesture is detected made by the user on the content area of the display screen separate from the notification area. The gesture indicates that the notification should be dismissed. Responsive to detecting the gesture, the notification is removed from display.

Another embodiment of the method includes providing a notification to a user of a client device, responsive to the user accessing content displayed in a content area of a display screen of the client device. The notification is provided based on the accessed content, and the notification is displayed in a notification area of the display screen, obscuring at least a portion of the accessed content. A gesture is detected from the user made on the content area of the display screen separate from the notification area. The gesture indicates that the notification should be dismissed. Responsive to detecting the gesture, the notification is removed from display.

BRIEF DESCRIPTION OF DRAWINGS

FIGS. 5A-5C show screenshot examples of displaying content and notifications to a user, according to one embodiment.

DETAILED DESCRIPTION

The figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
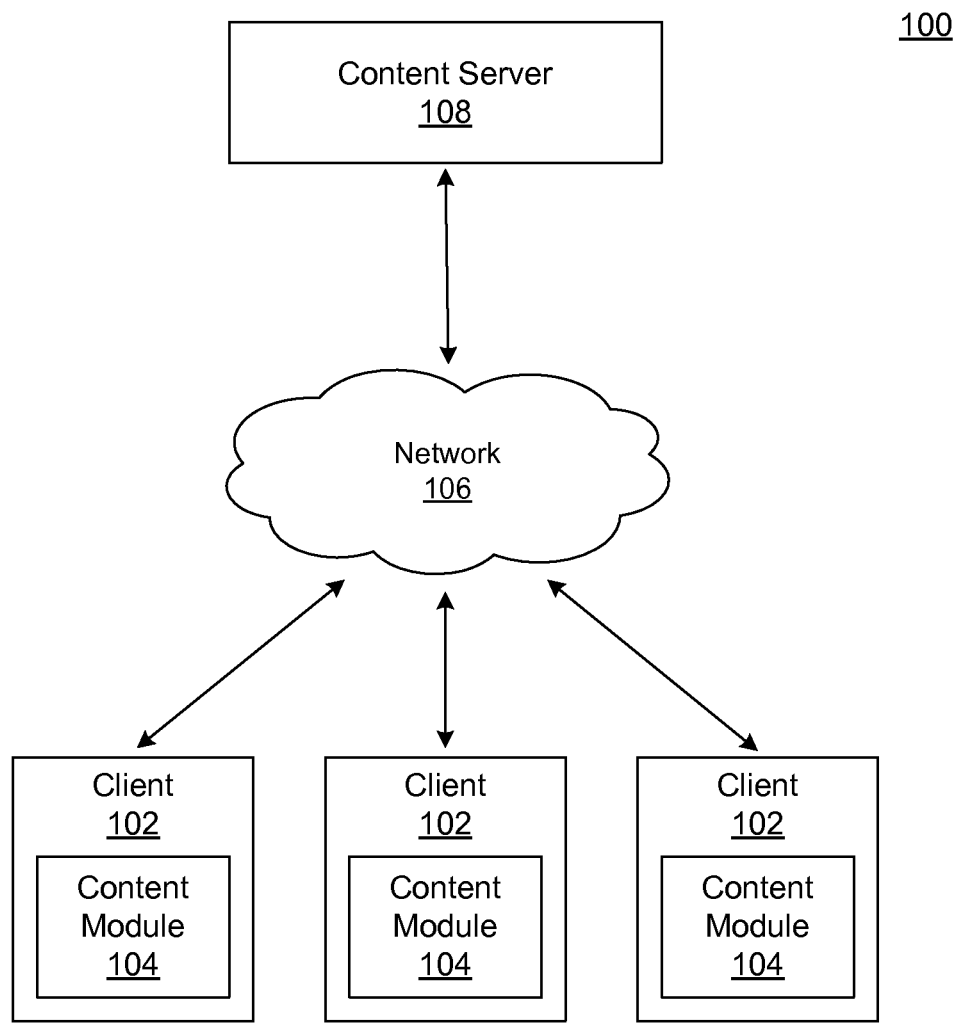
FIG. 1 is a high-level block diagram illustrating an environment for providing content and notifications to users, according to one embodiment.

FIG. 1 is a high-level block diagram illustrating an environment 100 for providing content and notifications to users, in accordance with one embodiment. As shown, the environment 100 includes multiple clients 102 connected to a content server 108 via a network 106. While only one content server 108 and three clients 102 are shown in FIG. 1 for clarity, embodiments can have multiple servers and many clients. Moreover, the content server 108 may be implemented as a cloud-based service distributed across multiple physical servers.

The clients 102 are electronic devices used by one or more users to access content and receive notifications. A client 102 is generally a mobile device such as a mobile phone, tablet computer, or a dedicated eBook reader. However, a client 102 can also be a desktop or laptop computer or another electronic device. A client 102 can execute one or more applications that support activities including obtaining, browsing, and accessing/viewing content available from the content server 108 or from other servers connected to the network 106. In some embodiments, content is stored directly on a client 102 and not downloaded from a content server 108. Content includes any form of electronic content, including text, images, video, applications, games, music, and other forms of media. In an embodiment, content is primarily textual and includes materials such as eBooks, newspaper articles, magazine articles, or blog posts.

The clients 102 include display screens that can display content to client 102 users. In one embodiment, the display screen is touch-sensitive. In some embodiments, the display screen cannot display an entire piece of content on the screen at once. For example, a display screen may show a portion of a newspaper article, but the rest of the article may be cut off at the bottom of the screen. To access the rest of the article, the user can scroll down the article by performing a swiping motion on the touch-sensitive display screen of the client 102. In other embodiments, the user can tap a particular area on the display screen or press a button on the client 102 to access the rest of the article.

Each client contains a content module 104. Multiple modules performing various functions are included within the content module 104. For example, the content module 104 may be responsible for identifying information and a status about a client 102 user or about content accessed by a user, displaying notifications to a user, detecting gestures performed on the client 102, and interpreting the gestures and implementing actions represented by the gestures on the client 102.

A client 102 can display a notification to a user on the display screen of the client 102. Notifications may be generated on the client 102 via the content module 104, or may be provided from the content server 108 or other servers to the content module 104 of the client 102. In some cases, a notification is provided based on content that the client 102 is currently accessing. The notification may be related to a user's status with respect to the content. In other cases, a notification is provided regardless of what content is being accessed by the user. A client 102 user can dismiss or otherwise interact with a notification when it appears on the display screen.

The content server 108 is a computer or other electronic device that provides content and notifications to a client 102. Content (or a notification) may be generated on the content server 108 or provided to the content server 108 from another source, and the content is then sent to a client 102. For example, a newspaper, magazine, or blog may provide content to the content server 108, and the content server 108 can provide the content to a client 102 through the network 106. Furthermore, the content server 108 retrieves information from clients 102 that can be used to generate notifications to send to the clients 102. For example, the content server 108 may retrieve information regarding an amount of content from a particular newspaper accessed by a client 102 user, and generate a notification for the user based on the content.

The network 106 represents the communication pathway between the content server 108 and clients 102. In one embodiment, the network 106 uses standard communications technologies or protocols and can include the Internet. Thus, the network 106 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 106 can be represented using technologies or formats including image data in binary form (e.g. Portable Network Graphics (PNG), the hypertext markup language (HTML), the extensible markup language (XML), etc. In addition, all or some links can be encrypted using conventional encryption technologies such as secure sockets layer (SSL), transport layer security (TLS), virtual private networks (VPNs), Internet Protocol security (IPsec), etc. In another embodiment, the entities on the network 106 can use custom or dedicated data communications technologies instead of, or in addition to, the ones described above.

Figure 2:
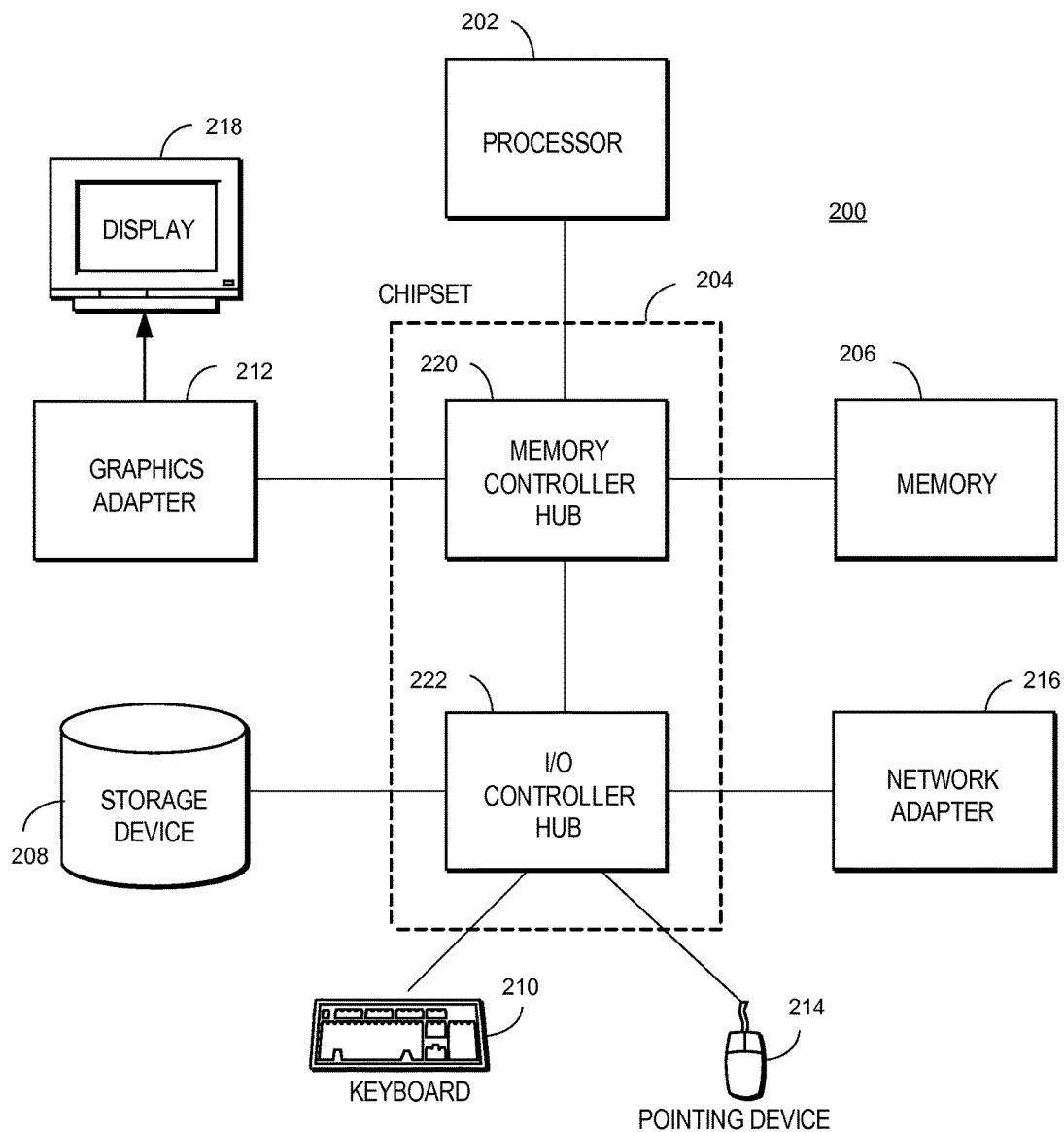
FIG. 2 is a high-level block diagram illustrating an example of a computer for use as a content server or a client, according to one embodiment.

FIG. 2 is a high-level block diagram illustrating an example of a computer 200 for use as a content server 108 or a client 102, in accordance with one embodiment. Illustrated is at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer 200. The graphics adapter 212 displays images and other information on the display device 218. In some embodiments, the display device 218 includes touch screen capability for receiving user input and selections. The network adapter 216 couples the computer system 200 to the network 106. Some embodiments of the computer 200 have different or other components than those shown in FIG. 2. For example, the content server 108 can be formed of multiple blade servers and lack a display device, keyboard, and other components.

The computer 200 is adapted to execute computer program modules for providing functionality described herein. As used herein, the term "module" refers to computer program instructions and other logic used to provide the specified functionality. Thus, a module can be implemented in hardware, firmware, or software. In one embodiment, program modules formed of executable computer program instructions are stored on the storage device 208, loaded into the memory 206, and executed by the processor 202.

Figure 3:
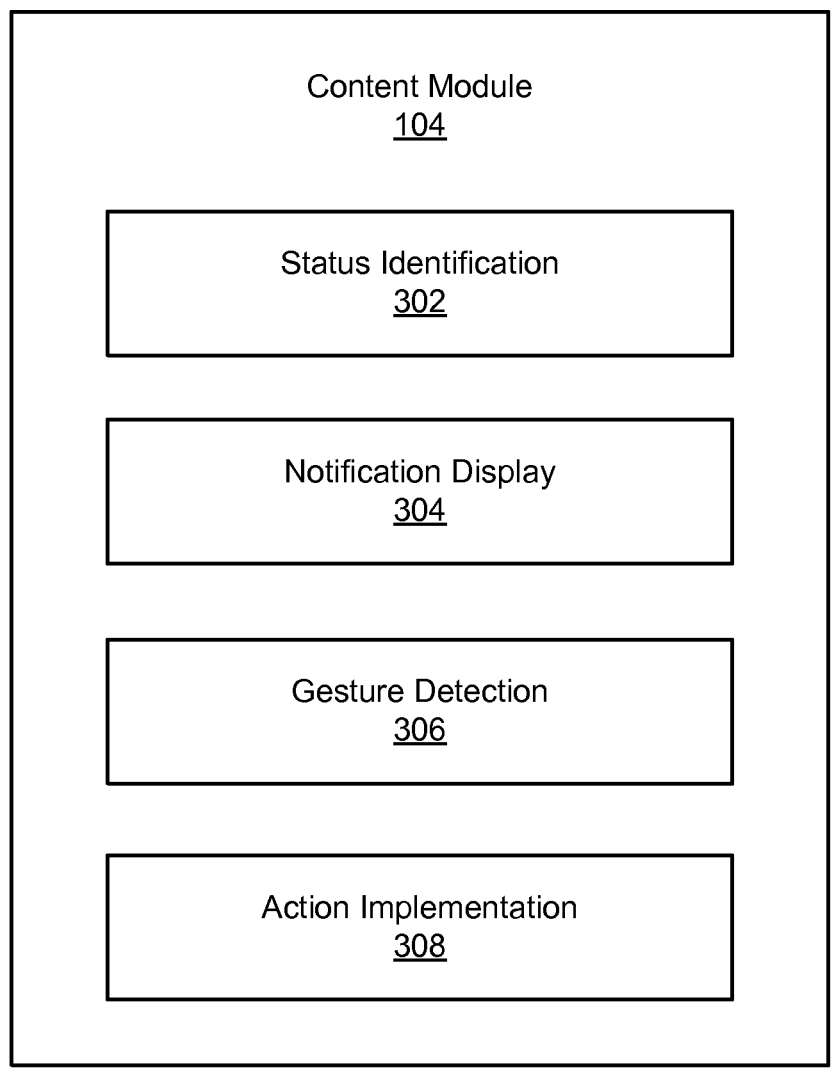
FIG. 3 is a high-level block diagram illustrating a detailed view of the content module of a client, according to one embodiment.

FIG. 3 is a high-level block diagram illustrating a detailed view of the content module 104 of a client 102 according to one embodiment. As shown in FIG. 3, multiple modules are included within the content module 104. In some embodiments, the functions are distributed among the modules in a different manner than described herein. Moreover, the functions are performed by other entities in some embodiments, such as by the content server 108.

A status identification module 302 identifies and monitors the statuses of client 102 users. A user status is generally related to aspects of a user associated with the user's access of content. In one embodiment, a user status is related to the content accessed by the user. In another embodiment, the user status is related to the user's access rights to the content. The status identification module 302 may identify client 102 user statuses directly, or receive status information from the content server 108. For example, if a user is accessing a newspaper article on the client 102, the status identification module 302 may detect a status that the user has read seven articles total from that newspaper, or that the user has 30 days remaining to read content from that newspaper. In some embodiments, a status of the user is not related to particular content, but is related to a characteristic of the user, including demographic information of the user (age, gender, location, school, job, etc.), or interests and preferences of the user. In other embodiments, a status of the user can be unrelated to content or demographic information of the user.

In situations in which the systems discussed here collect personal information about users, or may make use of personal information, the users may be provided with an opportunity to control whether programs or features collect user information (e.g., information about a user's social network, user status, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server 108.

One user or client 102 may have multiple statuses related to different content. The status identification module 302 keeps track of all statuses for a client 102 user. In some embodiments, the status identification module 302 detects and updates a user status in real-time or in substantially real-time. For example, if a user is currently viewing a piece of content, the status of the user related to that content may be updated based on the fact that the user has accessed the content. Each updated status of a user or client 102 can be stored in a database by the status identification module 302.

In one embodiment, the status indicates the number of pieces of content that a user is allowed to access from a specific source. In an example, if the user is reading a newspaper article on a client 102, the status identification module 302 may detect that the user has read four articles from that particular newspaper. If the newspaper only allows ten articles to be read by any one user or client 102 device for free, the status for the user may indicate that only six free articles remain for the user.

A notification display module 304 provides notifications for display on a display screen of a client 102. In one embodiment, a notification is provided in response to the status identification module 302 detecting a status of the client 102 user. For example, if the status identification module 302 detects that a user may only read six free articles from a particular newspaper, the notification display module 302 can provide a notification to the client 102 accordingly.

In an embodiment, a notification is provided for display to a user while the user is accessing content on the client 102. In a further embodiment, the notification is related to the content that the user is currently accessing. The content is displayed in a content area on the display screen of the client 102, and the notification is displayed in a notification area on the display screen separate from the content area or overlaid on top of the content area. In some embodiments, the notification obscures at least a portion of the content in the content area. In other embodiments, the notification is partially transparent. In one example, a client 102 user accessing a newspaper article may receive a notification for display that covers some of the article text. A notification can be provided for display anywhere on the display screen, such as the bottom of the screen, or in the center of the screen. The notification may cover a small portion of the screen, or cover the entire screen.

A notification is generally provided to a client 102 user as a reminder for the user, or to encourage the user to take some action. For example, the notification can remind a user that only six free articles remain before the user must subscribe to the appropriate newspaper to read further articles. The notification may also provide a subscription link to encourage the user to subscribe to the newspaper. In other embodiments, a notification can include an advertisement or a calendar reminder.

A gesture detection module 306 detects and interprets gestures performed by a user of the client 102 in response to the display of a notification by the notification display module 304. A gesture may or may not include physical interaction with the client 102 by a user. For example, a gesture by a user can include a swiping motion, a one-finger tap, a two-finger tap, or a swirling motion on a touch-sensitive display screen of the client 102. The gesture can also include pushing a button or performing some other action on the client 102 apart from the display screen. Alternatively, the gesture can otherwise reference an area on the display screen or other area of the client 102. The gesture indicates a desired action by the user related to the displayed notification, for example, to either dismiss the notification or interact further with the notification.

If a client 102 user receives a notification while accessing content, the user may wish to remove the notification and return to the content. In one embodiment, the user can dismiss the notification by performing a notification dismissal gesture. In some embodiments, the user performs a dismissal gesture referencing the content area, separate from the notification area. The gesture detection module 306 detects that the gesture has been performed referencing the content area, and dismisses the notification. In a further embodiment, the notification dismissal gesture includes a swiping motion by a user in the content area, indicating a notification dismissal as well as a scrolling instruction for the content.

A user may not wish to dismiss the notification, and instead may wish to interact with the notification or take an action associated with the notification. For example, if the notification invites a user to subscribe to a particular newspaper, and the user wishes to subscribe, the user can perform a gesture indicating this. In an embodiment, the gesture involves performing an interaction gesture referencing the notification area, separate from the content area. In a further embodiment, the interaction gesture includes a one-finger tap by a user on a link in the notification area. In some cases, the notification cannot be dismissed at all, and the client 102 user is forced to perform a gesture to interact with the notification before being allowed to access any further content. In an embodiment, this notification is a full-page notification, or a full message, which completely obscures the content in the content area, so that the user must interact with the notification.

An action implementation module 308 processes the gestures detected by the gesture detection module 306, and implements actions that are indicated by the gestures. When the gesture detection module 306 detects that a user has performed a gesture for interacting with the notification, the action implementation module 308 causes an appropriate action to be implemented. For example, the gesture detection module 306 may detect that a user has tapped a link on the notification that says "subscribe," and the action implementation module 308 may then implement the subscription process for the user. Implementing the subscription process may include displaying a full message with subscription details for the user. Furthermore, the action implementation module 308 can provide subscription information to the status identification module 302, so that the status identification module 302 can proceed to update the user's status in the database regarding the user's new subscription to a particular newspaper.

In an embodiment, the gesture detection module 306 detects that a user has performed a gesture referencing the content area indicating that a displayed notification should be dismissed. The action implementation module 308 then removes the notification in response to the gesture. In a further embodiment, the action implementation module 308 does not completely remove the notification, but instead replaces it with a minimized notification that is minimally visible somewhere on the display screen, for example on one edge of the display screen.

In one embodiment, the gesture performed referencing the content area simultaneously indicates a dismissal of the notification and an instruction related to the content. Responsive to the gesture, the action implementation module 308 removes the notification and also causes an action related to the content to occur that would have occurred even if the notification had not been displayed. For example, the notification dismissal gesture can include a swiping motion by a user in the content area, which indicates a scrolling instruction. Thus, a user may dismiss a notification while continuing to access the content by performing an action the user would normally perform to continue scrolling through the content. When the user performs the swiping motion in the content area, the notification is dismissed, and the article scrolls down.

Figure 4:
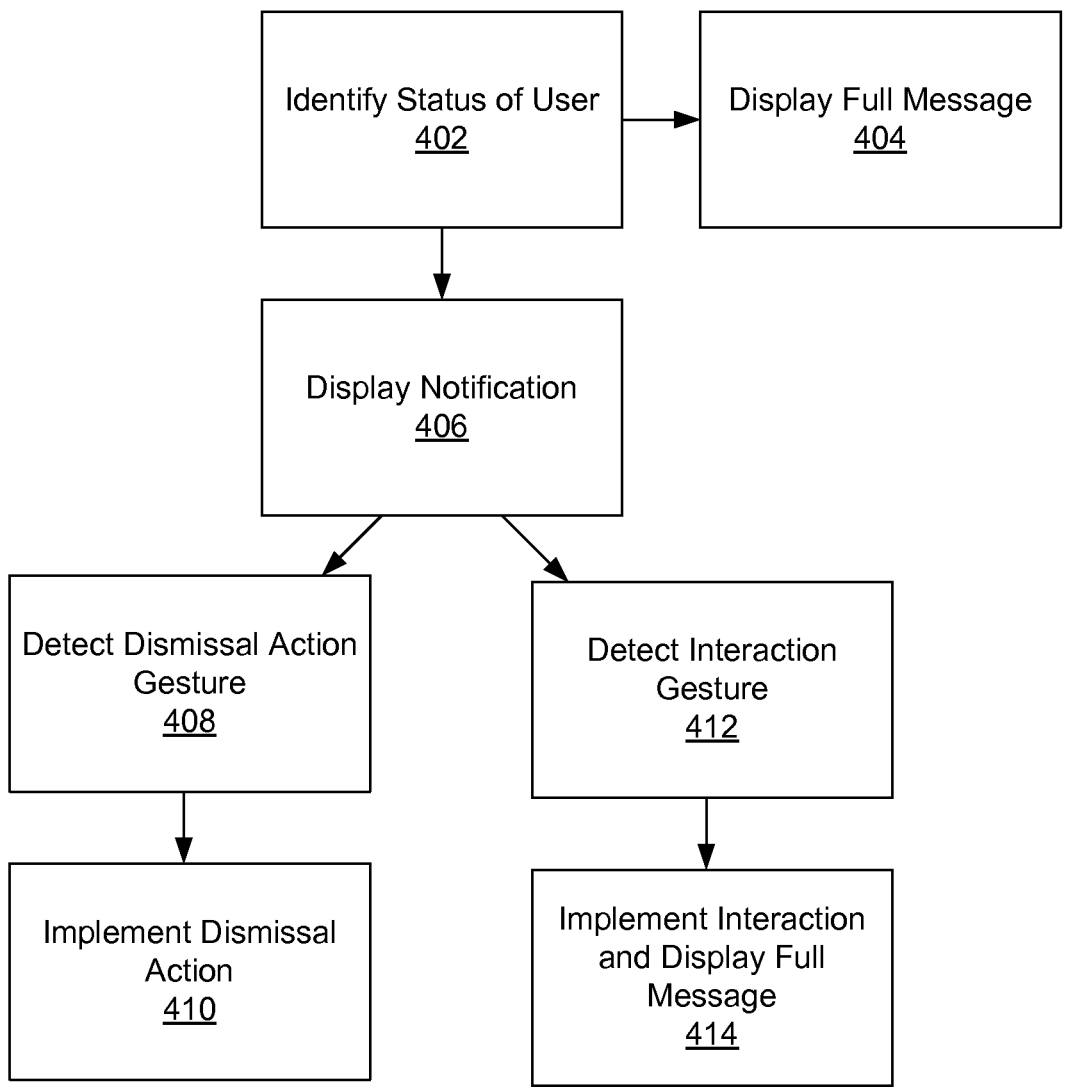
FIG. 4 is a flowchart illustrating a method of detecting user gestures related to a displayed notification, according to one embodiment.

FIG. 4 is a flowchart illustrating a method of detecting user gestures related to a displayed notification, according to one embodiment. While this description ascribes the steps of the method to the content module 104 of a client 102, a module of the content server 108 or other entities can perform some or all of the steps in other embodiments. In addition, the method can perform the steps in different orders or include different steps.

In step 402, the content module 104 identifies a status of the client 102 user while the user is accessing or attempting to access some content. If the status indicates that a full-page notification should be displayed, a full-page notification or full message is displayed 404. The notification fully obscures the content area on the display screen of the client 102. In this case, the user cannot dismiss the notification, but must interact with the notification before accessing any further content. However, if the status indicates that a normal notification should be displayed, a notification that only partially obscures the content area is displayed 406 on the display screen of the client 102.

After a notification is displayed 406, the user may choose to take an action indicating dismissal of the notification. In an embodiment, this action is a swiping motion performed in the content area of the display screen of the client 102. The gesture is detected as a dismissal action gesture 408, and the dismissal action is implemented 410, removing the notification from view. The user may then continue engaging with the content normally. In some cases, the dismissal action gesture simultaneously indicates an instruction related to the content, such as a scrolling instruction for the content.

Alternatively, the user may choose to take an action indicating an interaction with the notification. In this case, the user performs a gesture indicating an interaction with the notification 412. In an embodiment, this action is a one-finger tap performed in the notification area of the display screen of the client 102. The gesture is detected as an interaction gesture 412, and the interaction is implemented by displaying a full message to the user 414.

FIGS. 5A-5C show screenshot examples of displaying content and notifications to a user, according to one embodiment. These examples each illustrate a display screen of a mobile device. FIG. 5A shows content displayed in a content area 502 on a display screen of a mobile device. The content displayed in the content area 502 in the Figure is one example representing any form of content that can be displayed in the content area 502. Other embodiments may include a content area 502 that conveys different content, or no content at all.

FIG. 5B illustrates a notification 504 displayed in a notification area, partially obscuring the content 502 in the content area of the display screen. The notification 504 indicates that the user has 13 free articles remaining for access for the day. The notification 504 also provides two links for potential interaction by the user. The user may tap the "read article" link to dismiss the notification and return to the content. In another embodiment, the user may also perform an gesture in the content area to dismiss the notification and return to the content 502. The user may alternatively tap the "subscribe" link to subscribe to the content. The notification 504 displayed in the notification area in the Figure is one example representing any type of notification 504 that can be displayed in the notification area 504. Other embodiments may include a notification 504 conveying different information, or no information at all. In an embodiment, the notification 504 is displayed as an animation. For example, the notification 504 may be animated as sliding up from the bottom of the display screen, or by instantly or gradually materializing at the bottom of the display screen. Furthermore, if the user performs a gesture indicating that the notification should be dismissed, the notification 504 may be animated as sliding down beneath the bottom of the display screen, or sliding down to a minimized form at the bottom of the display screen, or the notification may disappear instantly or gradually.

FIG. 5C shows an example of a full message 506 that is provided in response to the user tapping the "subscribe" link of FIG. 5B. The full message 506 in FIG. 5C includes subscription details. The user may continue to interact with the full message 506 and proceed with the subscription process. The full message 506 displayed in the Figure is one example representing any type of full message 506 that can be displayed. Other embodiments may include a full message 506 conveying different information, or no information at all. In an embodiment, the full message 506 is displayed as an animation. For example, a notification 504 may be animated to expand into a full message 506. In another example, the full message 506 may be animated as sliding up from the bottom of the display screen, or by instantly or gradually materializing on the display screen.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for receiving reading data and analyzing the reading data to determine related timing information. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

The invention claimed is:

1. A computer-implemented method comprising:
    accessing, by a client device, content from a specific source;
    responsive to accessing the content, identifying a status of access rights of a user of the client device for the content, wherein the access rights indicate a number of pieces of content that the user of the client device is allowed to access from the specific source;
    displaying, by a touch-sensitive display screen of the client device, the content in a content area of the touch-sensitive display screen;
    displaying, by the touch-sensitive display screen, a notification, wherein the notification obscures at least a portion of the content, and wherein the notification includes information about the status of the access right of the user for the content;
    detecting, by the touch-sensitive display screen, a dismissal gesture at a portion of the touch-sensitive display screen at which the content is displayed; and
    responsive to detecting the dismissal gesture:
        dismissing the notification by at least ceasing to display the notification; and
        visually scrolling the content displayed in the content area of the touch-sensitive display screen.

2. The computer-implemented method of claim 1, wherein:
    the dismissal gesture comprises a swipe gesture to scroll through the content, and
    visually scrolling the content displayed in the content area comprises visually scrolling the content in a direction of the swipe gesture.

3. The computer-implemented method of claim 1, wherein the dismissal gesture comprises a swiping motion detected within the content area of the touch-sensitive display screen separate from a notification area of the touch-sensitive display screen.

4. The computer-implemented method of claim 1, wherein the dismissal gesture is a swirling motion.

5. The computer-implemented method of claim 1, further comprising updating the status of the access rights of the user based on the content displayed in the content area.

6. The computer-implemented method of claim 1, wherein the notification is partially transparent.

7. The computer-implemented method of claim 1, wherein the client is a mobile device.

8. The method of claim 1, wherein the notification includes a subscription offer, the method further comprising:
    detecting, by the touch-sensitive display screen, a gesture at a location of the touch-sensitive display screen at which the subscription offer is displayed; and
    responsive to detecting the gesture at the location:
        displaying, by the touch-sensitive display screen, subscription details for the specific source; and
        updating, by the client device, the status of the access rights of the user.

9. A system comprising:
    at least one processor;
    a touch-sensitive display screen that displays content in a content area of the touch-sensitive display; and
    a non-transitory computer-readable storage medium having executable computer program instructions executable by the at least one processor to:
    access content from a specific source;
    responsive to accessing the content, identify a status of access rights of a user for the content, wherein the access rights indicate a number of pieces of content that the user of the client device is allowed to access from the specific source;
    output, for display by a touch-sensitive display screen, the content in a content area of the touch-sensitive display screen;
    output, for display by the touch-sensitive display screen, a notification, wherein the notification obscures at least a portion of the content, and wherein the notification includes information about the status of the access right of the user for the content; and
    responsive to the touch-sensitive display screen detecting a dismissal gesture at a portion of the touch-sensitive display screen at which the content is displayed:
        dismiss the notification by at least causing the touch-sensitive display screen to cease to display the notification; and
        visually scroll the content displayed in the content area of the touch-sensitive display screen.

10. The system of claim 9, wherein:
    the dismissal gestures is a swipe gesture to scroll through the content, and
    the instructions are executable by the at least one processor to visually scroll the content displayed in the content area in a direction of the swipe gesture.

11. The system of claim 9, wherein the dismissal gesture comprises a swiping motion detected within the content area of the touch-sensitive display screen separate from a notification area of the touch-sensitive display screen.

12. The system of claim 9, wherein the notification is partially transparent.

13. The system of claim 9,
    wherein the notification includes a subscription offer, wherein the touch-sensitive display screen detects a gesture at a location of the touch-sensitive display screen at which a subscription offer is displayed, and wherein the non-transitory computer-readable storage medium further includes executable computer program instructions executable by the at least one processor to, responsive to detection of the gesture at the location:

output, for display by the touch-sensitive display screen, subscription details for the specific source; and update the status of the access rights of the user.

14. A non-transitory computer-readable storage medium encoded with instructions that, when executed, cause one or more processors of a computing device to:

access content from a specific source;

responsive to accessing the content, identify a status of access rights of a user of the computing device for the content, wherein the access rights indicate a number of pieces of content that the user of the computing device is allowed to access from the specific source;

output, for display by a touch-sensitive display screen, the content in a content area of the touch-sensitive display screen output, for display by the touch-sensitive display screen, a notification, wherein the notification obscures at least a portion of the content, and wherein the notification includes information about the status of the access right of the user for the content; and responsive to the touch-sensitive display screen detecting a dismissal gesture at a portion of the touch-sensitive display screen at which the content is displayed:

dismiss the notification by at least causing the touch-sensitive display screen to cease displaying the notification; and output, for display by the touch-sensitive display screen, a visual scrolling of the content.

15. The non-transitory computer-readable storage medium of claim 14, wherein:

the dismissal gesture is a swipe gesture to scroll through the content, and the visually scrolling of the content is in a direction of the swipe gesture.

16. The non-transitory computer-readable storage medium of claim 14, wherein the dismissal gesture comprises a swiping motion detected within the content area of the touch-sensitive display screen separate from a notification area of the touch-sensitive display screen.

17. The non-transitory computer-readable storage medium of claim 14, wherein the instructions further cause the one or more processors to:

responsive to the content being displayed in the content area, update the status of the access rights of the user.

18. The non-transitory computer-readable storage medium of claim 14, wherein the notification includes a subscription offer, and wherein the instructions further cause one or more processors of a computing device to, responsive to the touch-sensitive display screen detecting of a gesture at a location of the touch-sensitive display screen at which a subscription offer is displayed:

output, for display by the touch-sensitive display screen, subscription details for the specific source; and update the status of the access rights of the user.

* * * * *